United States Patent
Xue et al.

(10) Patent No.: US 6,484,958 B1
(45) Date of Patent: Nov. 26, 2002

(54) PATCH CORD CADDY

(75) Inventors: Bing Xue, San Jose, CA (US); Stefan Ignaczak, Santa Clara, CA (US); Dan Dan Yang, Ottawa (CA)

(73) Assignee: Dowslake Microsystems Corporation, Santa Clara, CA (US)

( * ) Notice: Subject to any disclaimer, the term of this patent is extended or adjusted under 35 U.S.C. 154(b) by 0 days.

(21) Appl. No.: 09/988,574

(22) Filed: Nov. 20, 2001

(51) Int. Cl.[7] .............................................. B65H 75/48
(52) U.S. Cl. ................................. 242/378.1; 242/381.1
(58) Field of Search .............................. 242/378.1, 378, 242/378.2, 378.3, 380, 381.1, 388, 388.1; 191/12.2 R, 12.4, 12.2 A

(56) References Cited

U.S. PATENT DOCUMENTS

| | | | | |
|---|---|---|---|---|
| 2,742,242 A | * | 4/1956 | Godwin .................... 242/378.2 |
| 3,474,985 A | * | 10/1969 | Brudi et al. .............. 242/378.3 |
| 3,854,017 A | * | 12/1974 | Crim ..................... 191/12.2 R |
| 4,416,429 A | * | 11/1983 | Jessamine ................ 242/388.1 |
| 4,417,703 A | * | 11/1983 | Weinhold ................. 242/378.1 |
| 4,466,581 A | * | 8/1984 | Hill .......................... 242/388.1 |
| 4,543,806 A | * | 10/1985 | Papandrea et al. ........... 242/380 |
| 4,901,938 A | * | 2/1990 | Cantley et al. ........... 242/378.1 |
| 6,315,231 B1 | * | 11/2001 | Liaom .................... 191/12.2 R |
| 6,328,243 B1 | * | 12/2001 | Yamamoto ............. 191/12.2 R |

* cited by examiner

Primary Examiner—William A. Rivera
(74) Attorney, Agent, or Firm—Cassan Maclean

(57) ABSTRACT

A caddy for dispensing fiber optic patch cord cables. The device has a housing inside of which a disk is rotatably mounted. A length of patch cord cable is wound around the circumference of the disk and an S-shaped channel is present on one side of the disk. The channel is sized to hold captive a section of the patch cord fiber optic cable, thereby preventing any loss of signal or damage to the patch cord fiber optic cable from undue bending stresses on the cable. The housing has an opening through which the two ends of the patch cord fiber optic cable protrude.

6 Claims, 4 Drawing Sheets

PATCH CORD CADDY

FIELD OF INVENTION

This invention relates to a caddy for storing and dispensing user desired lengths of fiber optic patch cords.

BACKGROUND OF THE INVENTION

The increasing use of fiber optic communication systems has led to a corresponding increase in the use of temporary connections which are usually effected by the use of fiber optic patch cords. These patch cords typically have a single strand of optical fiber encased in a suitable jacket. Another type of fiber optic patch cord is a ribbon cable having multiple strands of optical fibers.

Patch cords are often used in telecommunication systems where many cables are connected to sockets at the front end panels of equipment. In a research and/or testing environment, there may be multiple numbers of such patch cords connecting multiple types of equipment together. Normally these patch cords come in fixed lengths and these fixed length patch cords can lead to a veritable forest of extra length cord hanging between equipment. Similarly, the fixed length of such patch cords may require multiple patch cords to be connected together to provide the desired length. Because of these concerns, it is often quite difficult to manage such patch cords and their lengths in a research and/or testing environment.

The resulting forest of extra patch cords can lead to some unfortunate results as limbs and equipment can easily get entangled in these cords. Furthermore, the tangled patch cords can make the tracing of connections difficult at best. Additionally, since most patch cords look alike, it can be difficult to ensure that each of the tangled array of patch cords is correctly connected.

From the above, it is therefore clear that a device for managing patch cords is needed. Such a device must be simple to use, convenient to deploy, and easily scalable. It is also a prerequisite that the device shall not damage or unduly stress a patch cord.

SUMMARY OF THE INVENTION

The present invention seeks to meet the above need by providing a caddy for dispensing fiber optic patch cord cables. The device has a housing inside of which a disk is rotatably mounted. A length of patch cord cable is wound around the circumference of the disk and an S-shaped channel is present on one side of the disk. The channel is sized to hold captive a section of the patch cord fiber optic cable, thereby preventing any loss of signal or damage to the patch cord fiber optic cable from undue bending stresses on the cable. The housing has an opening through which the two ends of the patch cord fiber optic cable protrude. To use the device, the two ends of the patch cord cable are pulled from the opening of the housing thereby unwinding two lengths of the patch cord cable from the rotatable disk. Suitable means for rewinding the patch cord cable around the disk is provided so that once the user is done with the patch cord cable, the extended length of patch cord cable can be rewound and stored in the device. With this device, a user merely pulls the required length of patch cord cable from the opening and attaches the two ends to the equipment to be coupled together, thereby only using the desired length of patch cord cable. Excess lengths of patch cord cable are thus avoided as the device stores such unwanted lengths of cord within the housing.

In one aspect, the present invention provides a caddy for dispensing and storing a fiber optic patch cord, the cord having two ends, the caddy comprising:
- a housing having at least one opening through which the two ends protrude;
- a disk inside the housing carrying the cord wound around the circumference of the disk;
- pin means rotatably attaching the disk to the housing, the pin means being centrally located on the disk;
- disk return means for rotating the disk about the pin means, the disk return means being capable of permitting the disk to rotate in a first direction to dispense the cord from the housing and being capable of permitting the disk to rotate in a second direction to retract the cord back into the housing; and
- an S-shaped channel on a first side of the disk retaining a section of the cord placed in the channel such that the section is held captive by the channel;

wherein the or each opening is constructed and arranged to allow the cord to be dispensed and retracted without damage to the cord.

BRIEF DESCRIPTION OF THE DRAWINGS

The invention will now be described with reference to the drawings in which.

DETAILED DESCRIPTION OF THE INVENTION

Figure 1:
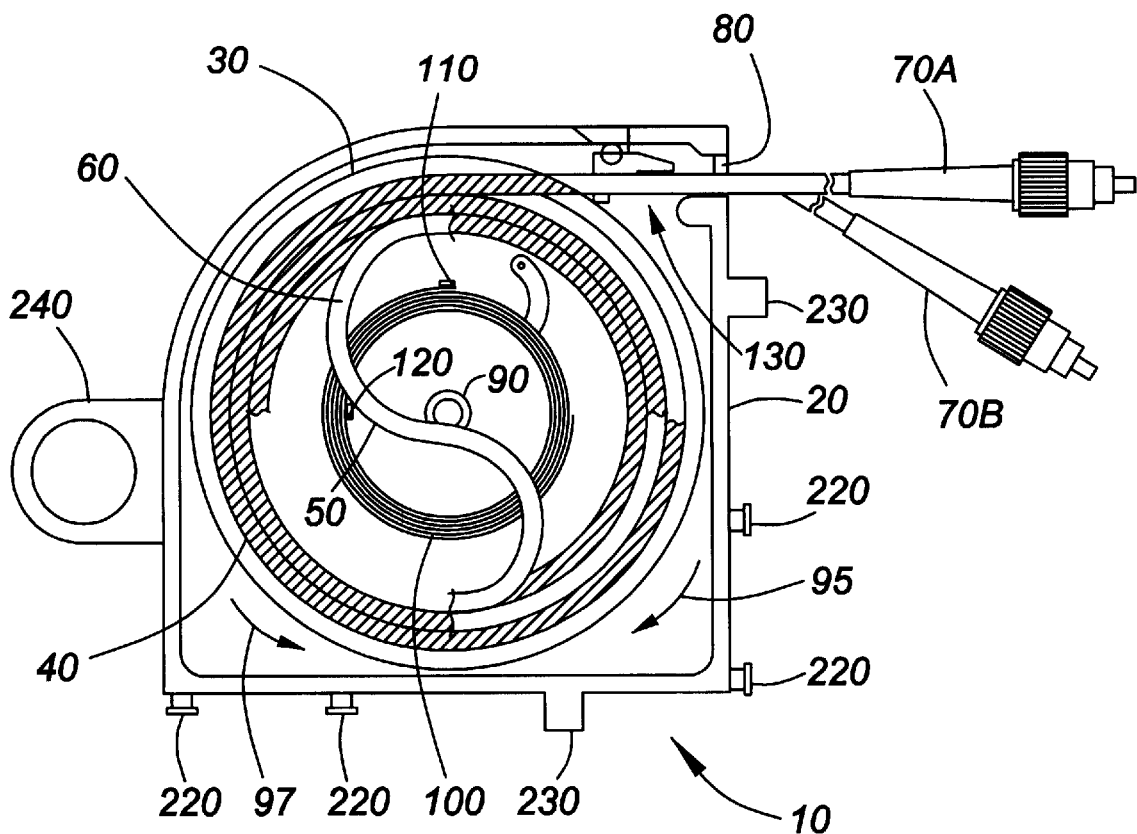
FIG. 1 illustrates a top partial cutaway view of a device for dispensing patch cord according to the invention.

Referring to FIG. 1, a caddy 10 for dispensing fiber optic patch cord cable is illustrated. As can be seen, the caddy 10 has a housing 20 in which is placed a rotatable disk 30. The patch cord cable 40 is wound around a circumference of the disk 30. Since the patch cord is a continuous length of fiber optic cable, to prevent damage to the patch cord cable 40, a section 50 of fiber optic patch cord is placed in a S-shaped channel 60 located at one side of the disk 30. This arrangement allows the two ends 70A, 70B of the patch cord cable 40 to both exit from an opening 80 of the housing 20. Also, as can be seen from FIG. 1, the disk 30 has a guide hole 90 that is centrally located on the disk 30. The guiding holes 90 are located in the housing 20 and cover 25. The disk 30 is rotatably attached to the housing 20 by a pin 160 in the guide hole(s) 90 (see FIG. 5).

The disk 30 can rotate in two directions about the pin 160. A first direction, as indicated by arrow 95, dispenses the patch cord cable 40 from the caddy 10 while unwinding the patch cord cable 40 from the disk 30. A second direction, as indicated by arrow 97, retracts the patch cord cable 40 back into the caddy 10 by rewinding the patch cord cable about the circumference of the disk 30.

To allow for the retraction of the patch cord cable 40 to be rewound around the disk 30, a spring 100 is provided. The spring 100 has a first end 110 attached to the housing and a second end 120 that is attached to the disk 30. The spring 100 and disk 30 are arranged so that rotation of the disk to unwind the patch cord 40 places the spring 100 under tension.

Figure 2A:
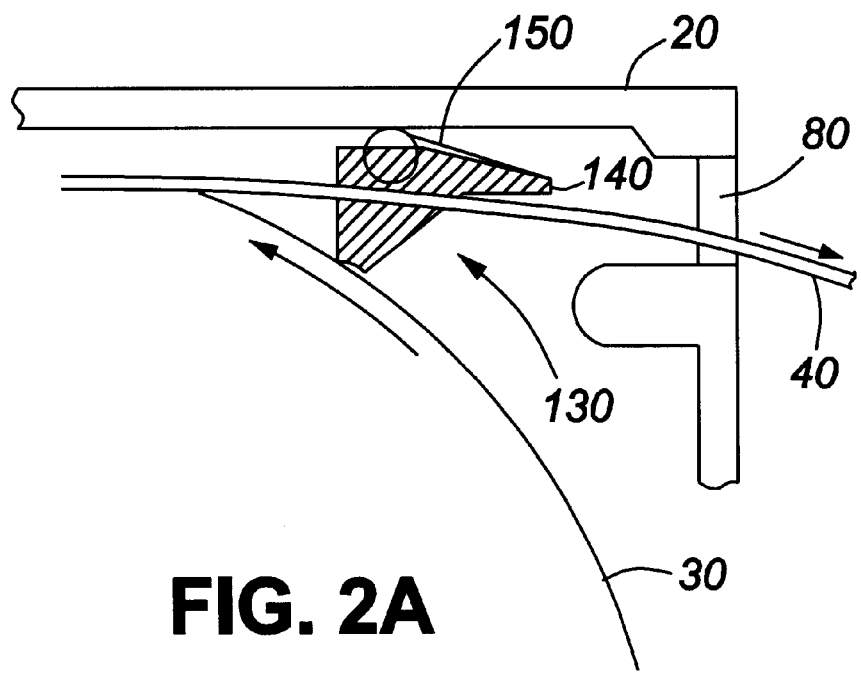
FIG. 2A illustrates an engaged cord retention system to be used in the device of FIG. 1.
Figure 2B:
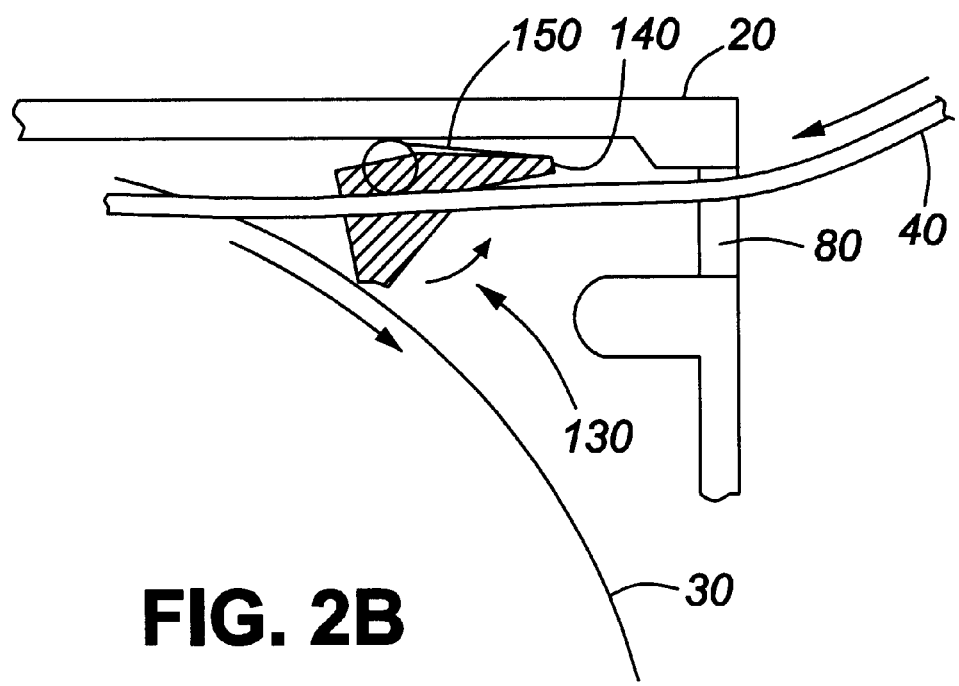
FIG. 2B illustrates the cord retention system of FIG. 2A when disengaged.

To prevent the length of patch cord cable dispensed by the user from being rewound around the disk 30 due to the action of the spring 100 under tension, a friction brake assembly 130 is provided, which is shown in FIGS. 2A and 2B. The friction brake assembly 130 comprises a friction brake 140 and a friction brake spring 150. The friction brake spring 150 pushes the friction brake 140 against the disk 30 when the friction brake assembly is engaged. This can be seen in FIG. 2A. When the friction brake 140 is pushed by the friction brake spring 150 against the edge of the disk 30, the disk 30 is prevented from rotating. This prevents deployed patch cord from being rewound around the disk.

When the friction brake is disengaged, as shown in FIG. 2B, the disk 30 is caused to rotate due to the action of the spring 100 that is under tension. Again as can be seen in FIGS. 2A and 2B, the engagement and disengagement of the friction brake 140 can be effected by pulling a length of patch cord 40 from the caddy. It can be seen in FIG. 2B that, when a length of patch cord is pulled from the caddy, the friction brake 140 pivots away from the disk 30. This is effected by pivotally attaching one end of the friction brake 140 to the housing 20. This can be seen in FIG. 2B.

Figure 1A:
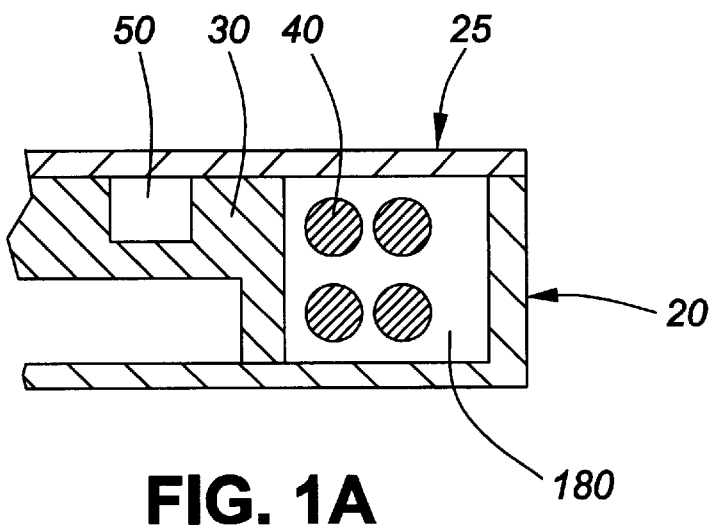
FIG. 1A illustrates a partial side view of an alternative embodiment of the device in FIG. 1.

Referring to FIG. 1A, a side partial view of another configuration of the caddy 10 is illustrated. A top cover 25 is provided and side walls 170 of the disk 30 (see FIG. 3) are not required as the side of the housing 20 and the side of the top cover 25 effectively provide a groove 180 for holding the cable 40.

Figure 3:
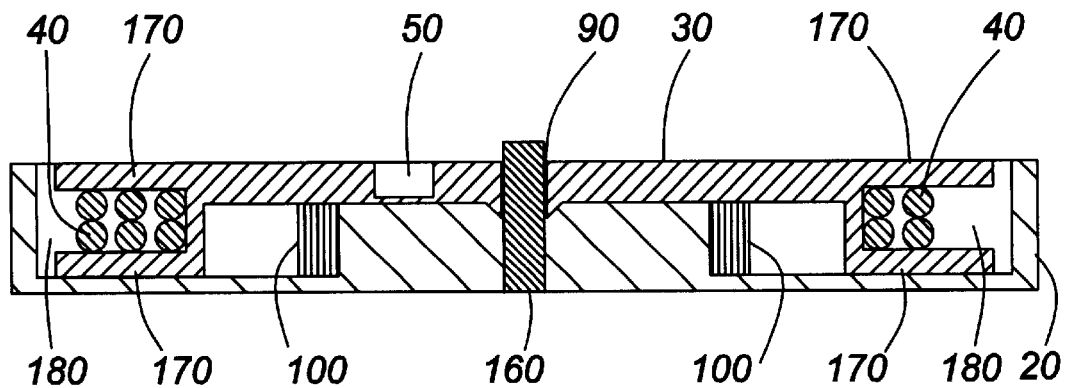
FIG. 3 illustrates a side cutaway view of the device in FIG. 1.

To further explain the disk 30, FIG. 3 provides a side sectional view of the caddy 10. The disk 30 has a channel 60 on one side of the disk 30. In this channel 60 is placed a section 50 of the patch cord 40. It is preferred that the section 50 be the midsection of the cord 40, so that an equal amount of cord 40 protrudes is dispensed from the opening 80. Furthermore, as can be seen in FIG. 3, the disk 30 rotates about the guide hole 90 through which the pin 160 is inserted. It is preferred that the disk 30 have walls 170 that provide a groove 180 in which the patch cord 40 is disposed. The side walls 170 can be the portion the disk 30 against which the fiction brake 140 is pushed to provide a braking function. It should be noted that the pin 160 and guide hole 90 may be constructed as a unitary pin means assembly. The pin 160, in this case, would be integral to the disk 30 and would be rotatably seated in a centrally located guide hole in the housing. If cover 25 is provided, then the other end of the pin 160 would also be rotatably seated in a corresponding guide hole in the cover 25.

To keep the section 50 within the channel 50, the channel 60 may be sized to hold the section 50. Alternatively, the channel 60 may be covered by the top cover 25 to hold the section 50 within the channel 50.

Figure 4:
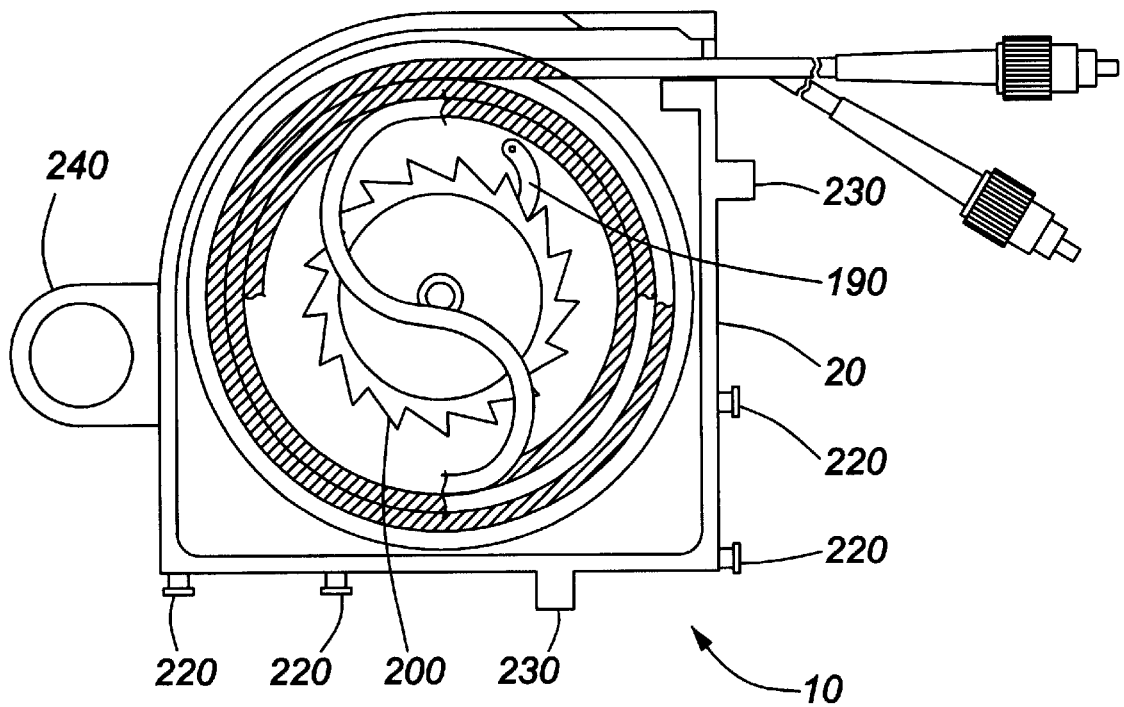
FIG. 4 is top partial cutaway view of a second embodiment of the device in FIG. 1 using a pawl and ratchet wheel system for cord retention.

It should be noted that while FIGS. 1 and 2 illustrate the friction brake assembly 130 as a cord retention means, other systems for preventing the disk from rotating due to the tension of the spring may be used. Referring to FIG. 4, such system using a pawl and ratchet system as the cord retention means is illustrated. It must be noted that FIG. 4 is similar to FIG. 1, except that the friction brake assembly has been removed and has been replaced by a pawl 190 and a ratchet 200. Furthermore, the spring 100 is not illustrated in FIG. 4.

In FIG. 4, the ratchet wheel 200 and the pawl 190 prevent the disk from rotating due to the tension of the spring 100. Essentially, the ratchet wheel 200 and the pawl 190 allow the disk 30 to rotate in the first direction that unwinds the patch cord 40 from the disk but the action of the pawl 190 against the teeth of the ratchet wheel 200 prevents the disk 30 from rotating in the second direction to rewind the cord 40 around the disk 30. This configuration therefore allows a user to pull and retrieve from the caddy 10, any amount of patch cord that he or she may require but prevents the spring 100 from retrieving the dispensed patch cord until the user desires this to be done. To do this, the pawl 190 is disengaged from the teeth of the ratchet wheel 200 using suitable means such as a manual switch attached to the pawl. This will allow the disk 30 to rotate about the guide hole 90 due to the action of the spring 100.

Figure 5:
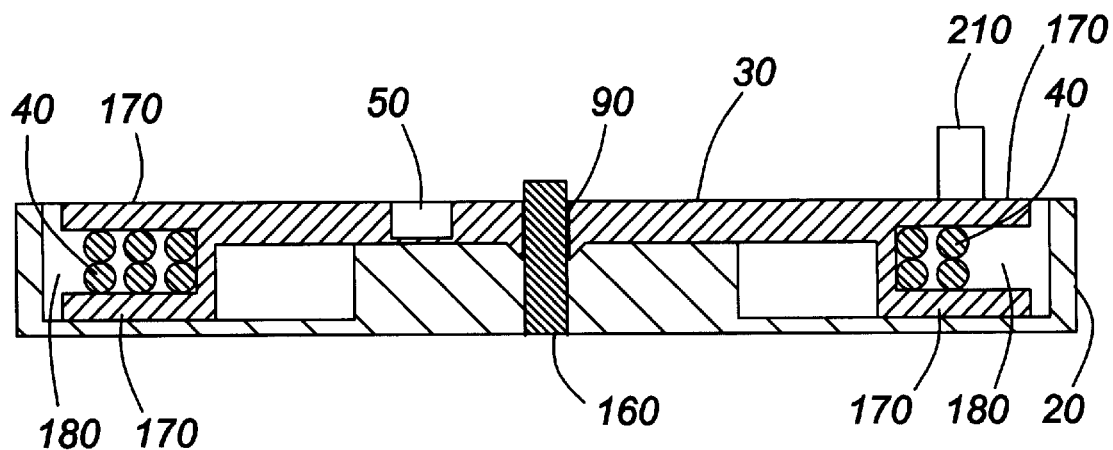
FIG. 5 is a side cutaway view of the device in FIG. 3 using a different cord return system.

While FIGS. 1 to 4 illustrate that the spring 100 is used as a disk return means that allows the disk to rotate about the guide hole and thereby rewind the dispensed patch cord cable around the disk 30, other systems may be used for this same purpose. A simpler system for such a function would be that illustrated in FIG. 5. FIG. 5 is similar to FIG. 3 in that it is a side cutaway view of the caddy 10 and illustrates the components of the caddy especially that of the disk 30. However, in FIG. 5, the spring 100 is not present and has been replaced by a handle 210. The handle 210 is attached to one surface of the disk 30 and is placed off center from the guide hole 90 of the disk 30. This system allows the user to manually rewind the patch cord 40 around the disk 30. It also allows the user to dispense as much cord as he or she wants from the caddy without having to deal with an automatic disk return means. The handle 210 in FIG. 5 thereby allows the user to manually rewind or unwind the patch cord cable about the circumference of the disk 30.

Another detail that is of import relates to the radius of the S-shaped channel 60 that is on one side of the disk 30. The radius of the S-shaped channel 60 must be chosen so as to avoid any bending loss that may be incurred by the bending of the fiber optic cable. By making the curves on the S-shaped channel as gradual as practicable, the bending of the section of the patch cord that is to be placed in the channel will therefore be gradual and minimize any problems regarding bending loss.

It should be noted that, while not illustrated in the Figures, a cover may be provided to cover the housing 20 and the components placed within. If a cover is not provided, suitable means for rotatably attaching the disk to the housing. This means can be as simple as a nut and bolt to prevent the disk from detaching from the housing.

To assist in the mounting of the caddy in a laboratory setting or in a test platform, latch pins 220 are provided on the outside of the housing 20 which can be inserted in suitable notches designed specifically for this purpose. Provided in conjunction with the latch pin 220 are base stoppers 230. These base stoppers 230 can be used to position the caddy 10 at a specific distance from a wall or floor upon which the caddy may be resting. In addition to the latch pins 220 and base stopper 230, a mounting such as shown at 240 may be attached to the housing 20 to allow the caddy to be suspended from a suitable hook or pin.

It should further be noted that dispensing a length of cord 40 from the opening dispenses two equal lengths of cord 40—one length for each end that protrudes from the opening. To this end, the opening 80 need not be a single opening. Two openings may be provided to allow one opening for each length of cord dispensed. These openings need not be side by side but may be at different locations on the housing as long as the openings do not damage the cord 40 when the lengths of cord are dispensed or retracted. As can be seen in FIG. 1, the opening 80 is in a line generally tangential to the disk 30. The allow for the decreasing amount of cord 40 wound around the disk 30 and thereby an increasing angle between a line tangential to the disk 30 and the opening 80, the opening 80 may be large enough so that the cord 40 being dispensed through the opening 80 will always be at right angles to a first wall of the housing 20 while being parallel to a second wall perpendicular to the first wall.

As an alternative to the above discussion regarding the opening, the housing 20 and the top cover 25 may be used to provide the walls for keeping the cord 40 within the caddy with the side walls of the housing 20 being removed. The caddy 10 can therefore have a circumferential opening along with a suitable guide post or bar that will guide the cord 40 that is dispensed.

Figure 6:
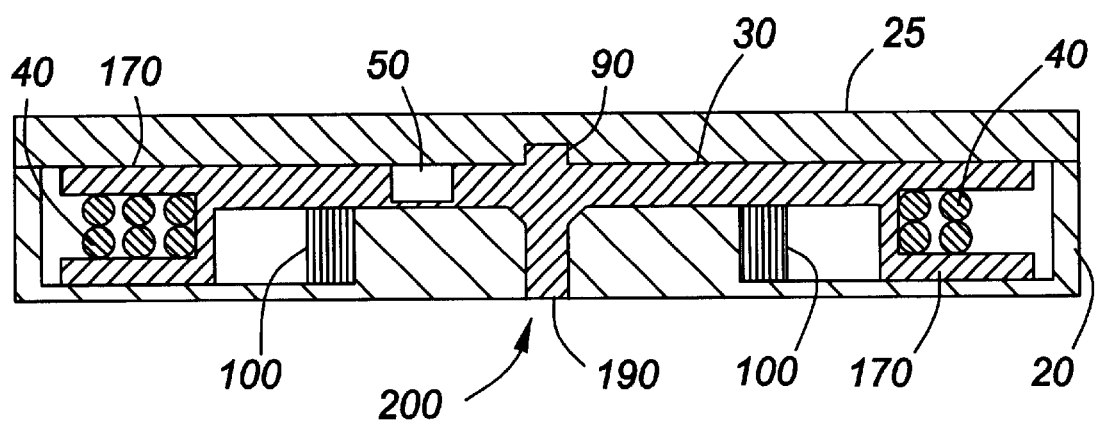
FIG. 6 is a side cut-away view of an embodiment of the invention similar to that illustrated in FIG. 3.

Referring to FIG. 6 one embodiment of the invention is illustrated having some of the features described above. As can be seen in FIG. 6, this embodiment has a top cover 25 to hold the disk 30 rotatably attached to the housing 20. Furthermore, the disk return means for this embodiment is that of spring 100. It should also be noted that the guide hole 90 and pin 160 has been replaced by a pin 190 that is integral to the disk 30. This pin 190 cooperates with a centrally located hole 200 in the body 20. The disk 30 can therefore rotate about the hole 200 using the pin 190. As should be clear from FIG. 6, the top cover 25 is attached to the body 20 and, at the same time, holds the disk 30 between the cover 25 and the outer wall of the body 20. All the other features of the invention including the channel 50, remains the same as described above.

A person understanding the above-described invention may now conceive of alternative designs, using the principles described herein. All such designs which fall within the scope of the claims appended hereto are considered to be part of the present invention.

We claim:

1. A caddy for dispensing and storing a continuous fiber optic patch cord, the cord having two ends, the caddy comprising:

a housing having an opening through which the two ends protrude;

a disk inside the housing carrying the cord wound around the circumference of the disk;

pin means rotatably attaching the disk to the housing, the pin means being centrally located on the disk;

disk return means for rotating the disk about the pin means, the disk return means being capable of permitting the disk to rotate in a first direction to simultaneously dispense both ends of the cord from the housing byway of the opening and being capable of permitting the disk to rotate in a second direction to simultaneously retract both ends the cord back into the housing by way of the opening; and an S-shaped channel on a first side of the disk retaining a section of the cord placed in the channel such that the section is held captive by the channel;

wherein the opening is constructed and arranged to allow both ends of the cord to be dispensed and retracted without damage to the cord.

2. A caddy as in claim 1 wherein the disk return means is a spring attached to the housing at one end of the spring such that rotation of the disk to unwind the cord from the disk places the spring under tension and wherein the caddy further includes cord retention means for holding the disk in place when the spring is under tension.

3. A caddy as in claim 2 wherein the cord retention means comprises a friction brake assembly attached to the housing adjacent to the opening, the friction brake assembly providing friction against the disk such that when the spring is under tension the friction brake assembly provides enough friction to prevent unwound cord from being rewound back to the disk.

4. A caddy as in claim 3 wherein the friction brake assembly comprises:

an elongated friction brake pivotably attached to the housing at a connection point; and a brake spring attached to the housing at a first brake spring end, the brake spring also being attached to the friction brake at a second friction brake spring end such that the brake spring pushes one end of the friction brake against the disk.

5. A caddy as in claim 2 wherein the cord retention means comprises:

a ratchet attached to and coaxial with the disk at a second side of the disk;

a pawl pivotably attached to the housing such that the pawl engages teeth of the ratchet to only allow rotation of the disk in a first direction that places the spring under tension; and pawl release means for releasing the pawl such that when the pawl release means is engaged, the disk is allowed to rotate in a second direction opposite to the first direction.

6. A caddy as in claim 1 wherein the disk return means is a handle attached to the disk such that the disk can be manually rotated to wind or unwind the cord about the circumference of the disk.

* * * * *